Patented Dec. 31, 1929

1,741,955

UNITED STATES PATENT OFFICE

MALCOLM N. RICH, OF EAST ORANGE, NEW JERSEY, ASSIGNOR TO WESTINGHOUSE LAMP COMPANY, A CORPORATION OF PENNSYLVANIA

METHOD OF OBTAINING CHROMIUM

No Drawing. Application filed November 9, 1927. Serial No. 232,204.

This invention relates to a method of reducing rare refractory metal oxides and more particularly to a method of reducing chromium oxide.

It has been proposed to reduce chromium oxide by hydrogen but such processes have proven unsatisfactory because no special precautions were taken to prevent impurities such as oxygen, nitrogen, hydrocarbons, moisture and the like from being carried into contact with the oxide during the reduction.

In the present method of reducing the oxides of tungsten and molybdenum, the oxide is placed in boats which latter are inserted in a hydrocarbon fired tube furnace through which hydrogen is passed or else a tungsten or nichrome wire wound furnace is employed. In such furnaces the hydrogen even though previously purified becomes contaminated either from the hydrocarbons or through passage over the tungsten or nichrome heating coils.

I have found that chromium oxide may be successfully reduced by means of hydrogen provided the hydrogen is first previously purified and then passed directly over the chromium oxide without first coming into contact with the furnace heating wires, etc. The process of purification of the hydrogen used in preparing chromium metal powder must include such steps as high compression, following which the gas should be passed over heated silver pumice, copper turnings, or some such preheater to fix the oxygen content and should be carefully dried with KOH, $P_2O_5$, and finally passed through a liquid air trap to remove the last traces of moisture. Previously the gas must have been thoroughly freed of nitrogen otherwise during subsequent reduction of the chromium oxide the reduced metal will react with the nitrogen content of the gas to form a highly stable nitride which renders the metal extremely brittle and unworkable.

To effect the reduction of the chromium oxide I have provided a furnace comprising a tube of iron which is placed in a nichrome or tungsten wound furnace. The hydrogen thus purified is passed directly through the iron tube in a strong free flow. The purified hydrogen passing directly through the tube is not subject to contamination as in the prior processes and is thus wholly effective in effecting a complete reduction of the chromium oxide. In order to prevent any possible contamination with oxygen or nitrogen the process is preferably not made a continous one, and the furnace should not be opened until cooled to room temperature.

The process may be substantially as follows: chromium oxide ($Cr_2O_3$), prepared by the ignition of ammonium chromate $(NH_4)_2CrO_4$, or oxide from other sources of high degree of purity and suitable fineness of particle size, is placed in boats, which latter are inserted in a seamless iron tube (preferably a calorized iron tube to eliminate oxidation of the tube) and the iron tube heated externally by an electric tube furnace to approximately 900°–1100° C., depending upon the particle size of the metal desired. A strong free flow of hydrogen which has previously been purified as has been described is maintained through the tube, and the heating continued until complete reduction of the oxide to metal has been attained. The temperature, time and flow of the hydrogen are variable and dependent upon the amount of chromium oxide in the boat, size of the iron tube, etc. The boats are not passed continuously through the tube but remain stationary therein until the reduction is completed after which the furnace is opened when cooled to room temperature.

The chromium metal powder prepared in accordance with my process is suitable for fabrication into wire by swaging and drawing following briquetting and sintering as specified more fully in copending application Serial No. 104,917, filed April 27, 1926, John W. Marden and Malcolm N. Rich, assigned to the same assignee as the present application.

Modifications may occur to those skilled in the art, however, such modifications are contemplated as come within the spirit and scope of my invention as defined by the appended claims.

What is claimed is:

1. The process of producing chromium metal powder which comprises heating chromium oxide to a temperature of about 900° C. and passing thereover and into direct contact therewith, a strong free flow of previously purified hydrogen.

2. The process of obtaining chromium metal powder free from contaminating substances which comprises placing an oxide of chromium in a vessel, surrounding said vessel by an iron tube, heating said tube externally to about 900° C. and passing through said tube a strong free flow of previously purified hydrogen.

3. The process of producing chromium powder suitable for fabrication into wire which comprises heating chromium oxide to about 900° C. and bringing into direct contact therewith a strong free flow of hydrogen free from nitrogen, oxygen, water vapor and the like.

4. The process of producing chromium powder suitable for fabrication into wire which comprises heating chromium oxide to about 900° C. and bringing into direct contact therewith, hydrogen free from nitrogen, oxygen, water vapor and the like, said hydrogen being passed over the chromium oxide in a strong free stream.

5. The process of producing chromium powder suitable for fabrication into wire which comprises heating chromium oxide to about 900° C. and bringing into direct contact therewith, hydrogen free from nitrogen, oxygen, water vapor and the like, said hydrogen being passed over the chromium oxide in a strong free stream, the temperature, time and flow of hydrogen being varied in accordance with the quantity of chromium being reduced and particle size of the metal desired to be obtained.

6. The method of reducing chromium oxide to form chromium metal which comprises arranging the chromium oxide in boats, placing the boats in an iron tube, heating the tube externally to about 900° C., and freely flowing through said tube previously purified hydrogen, allowing the tube to cool to room temperature and then removing the reduced metal.

In testimony whereof, I have hereunto subscribed my name this 8th day of November, 1927.

MALCOLM N. RICH.